J. H. BROWN.
FRUIT-DRIER.

No. 185,890. Patented Jan. 2, 1877.

Witnesses
Thos. A. Macaulay
Hugh Callay

Inventor
John H. Brown.

UNITED STATES PATENT OFFICE.

JOHN H. BROWN, OF BROOKLYN, ASSIGNOR TO ROYAL BALL, OF NEW YORK, N. Y., AND CHARLES S. BRADFORD, JR., OF WESTCHESTER, PA.

IMPROVEMENT IN FRUIT-DRIERS.

Specification forming part of Letters Patent No. 185,890, dated January 2, 1877; application filed November 25, 1876.

*To all whom it may concern:*

Be it known that I, JOHN H. BROWN, of the city of Brooklyn, county of Kings, and State of New York, have invented certain new and useful Improvements in Fruit-Drying Apparatus, of which the following is a specification, reference being had to the accompanying drawings, forming part of the same.

Similar letters refer to like parts.

The object of my invention is to provide a cheap and efficient fruit-drying apparatus, which may be used as an atmospheric or as a vacuum drier; and consists of a wooden box or chamber of suitable dimensions, made air-tight by a metallic sheathing, and provided with pipes for heating, and an automatic apparatus for regulating the temperature to any required degree.

Figure 1:
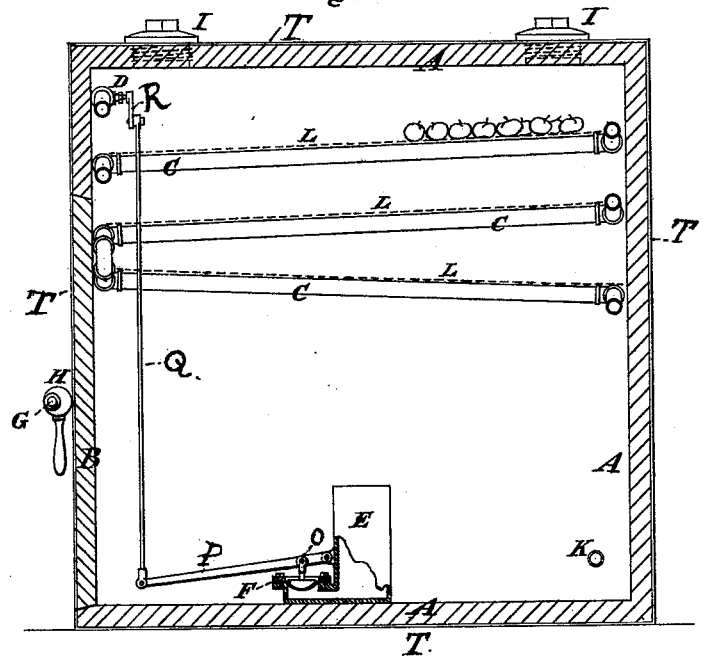
Figure 2:
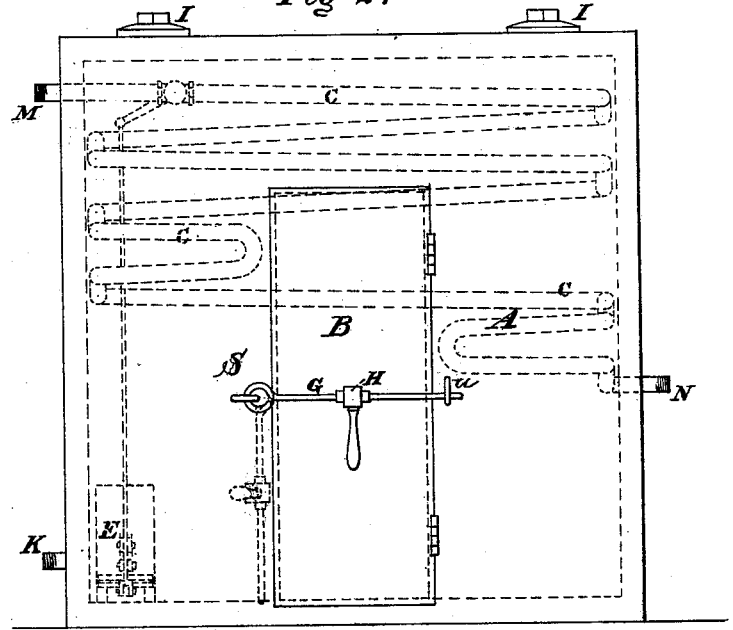

In the drawing, Figure 1 is a vertical cross-section. Fig. 2 is a front elevation.

A A is a wooden box or chamber, containing the pipes for heating, an automatic device for regulating the temperature, and wire shelving, on which the fruit to be dried is placed. B is a door, which may be made air-tight by any of the common modes of packing. C C are steam-pipes with inlet and outlet connections M and N outside the chamber. D is a throttle-valve, operated by the levers P and R and connections Q, which are, in turn, operated by the expansion and contraction of mercury in the cylinder E. F is a rubber diaphragm, which yields to the action of the mercury in the cylinder E to operate the valve D. G is a cross-bar, hinged at S, and which, passed behind the staple *u*, secures the door firmly in position, and is locked by the eccentric lever H. I I are screw-plugs, which are to be taken out when the apparatus is used as an atmospheric drier. K is a pipe located near the bottom of the chamber, to be used when the air is exhausted from the box to create a vacuum or a circulation of air. L L L are wire shelves resting on the pipes, on which the fruit to be dried is placed. T T T T is the metallic sheathing surrounding the box and making it air-tight.

In using the apparatus as a vacuum drier, steam-heated air is admitted to the pipe-coils at the inlet M, thus raising the temperature within the chamber. The air within being exhausted by any approved method, and to any degree of *vacuo* through the pipe K, the sap of the fruit will leave it more freely and quicker and be evaporated by the heat. When the apparatus is to be used as an atmospheric drier, the plugs I I are to be removed, and the air within the chamber exhausted by any approved means through the pipe K. A current of heated air will then circulate through the apparatus and dry the fruit quicker than by exposure to an undisturbed atmosphere.

I have now fully described my invention and the manner of carrying it into effect.

I claim—

1. In a fruit-drier, the combination of the air-tight chamber, pump, and automatic regulating device, as set forth.

2. In a fruit-drier, the mercury-chamber E, diaphragm F, levers P and R, and valve D, arranged and combined as set forth.

JOHN H. BROWN.

Witnesses:
THOS. A. MACAULEY,
HUGH CALLARY.